(12) United States Patent
Kouchiyama et al.

(10) Patent No.: US 7,670,514 B2
(45) Date of Patent: *Mar. 2, 2010

(54) METHOD OF PRODUCING OPTICAL DISK-USE ORIGINAL AND METHOD OF PRODUCING OPTICAL DISK

(75) Inventors: Akira Kouchiyama, Kanagawa (JP); Katsuhisa Aratani, Chiba (JP)

(73) Assignee: Sony Corporation, Tokyo (JP)

( * ) Notice: Subject to any disclaimer, the term of this patent is extended or adjusted under 35 U.S.C. 154(b) by 208 days.

This patent is subject to a terminal disclaimer.

(21) Appl. No.: 10/498,044

(22) PCT Filed: Sep. 25, 2003

(86) PCT No.: PCT/JP03/12236

§ 371 (c)(1),
(2), (4) Date: Jun. 8, 2004

(87) PCT Pub. No.: WO2004/034391

PCT Pub. Date: Apr. 22, 2004

(65) Prior Publication Data

US 2005/0226999 A1 Oct. 13, 2005

(30) Foreign Application Priority Data

Oct. 10, 2002 (JP) ............................. 2002-297892

(51) Int. Cl.
*B29D 17/00* (2006.01)
*B29D 11/00* (2006.01)
*G03F 7/00* (2006.01)
*G03C 1/00* (2006.01)

(52) U.S. Cl. ...................... 264/1.33; 264/1.38; 264/2.5; 425/810; 430/270.1; 430/311

(58) Field of Classification Search ........................ None
See application file for complete search history.

(56) References Cited

U.S. PATENT DOCUMENTS 3,895,234 A * 7/1975 O'Keeffe et al. ......... 250/492.2

(Continued)

FOREIGN PATENT DOCUMENTS

| EP | 1 477 847 A1 | 11/2004 |
|----|-------------|---------|
| JP | 55-17152 | 2/1980 |
| JP | 56-125743 | 10/1981 |
| JP | 60-173736 | 9/1985 |
| JP | 60-173737 | 9/1985 |
| JP | 03-129349 | 6/1991 |

(Continued)

OTHER PUBLICATIONS

Steven S. Zumdahl, Chemistry, Second Edition, 1989, D.C. Heath and Company, p. 1072.*
A European Search Report in counterpart EP Application No. 03807973.7-2210 dated Jan. 5, 2009.

*Primary Examiner*—Jeffrey Wollschlager
(74) *Attorney, Agent, or Firm*—Sonnenschein Nath & Rosenthal LLP

(57) ABSTRACT

A method for manufacturing an optical disc master using an existing exposure system, and a method for manufacturing an optical disc having higher recording capacity. The method for manufacturing an optical disc, using a master to produce the optical disc having an irregular pattern thereon, the master being produced by the steps of forming a resist layer composed of a resist material including an incomplete oxide of a transition metal such as W or Mo on a substrate, the oxygen content of the incomplete oxide being smaller than the oxygen content of the stoichiometric composition corresponding to a valence of the transition metal; selectively exposing the resist layer with laser according to a recording signal pattern; and developing the resist layer to form the predetermined irregular pattern.

11 Claims, 9 Drawing Sheets

U.S. PATENT DOCUMENTS

| | | | |
|---|---|---|---|
| 4,724,043 A * | 2/1988 | Bergendahl et al. | 216/2 |
| 5,869,212 A * | 2/1999 | Hashimoto | 430/5 |
| 6,060,220 A * | 5/2000 | Snortland | 430/320 |
| 6,706,358 B1 * | 3/2004 | McDaniel et al. | 428/64.1 |
| 6,806,021 B2 * | 10/2004 | Sato et al. | 430/198 |
| 7,175,962 B2 * | 2/2007 | Kouchiyama et al. | 430/270.1 |
| 7,344,822 B2 * | 3/2008 | Kouchiyama et al. | 430/270.1 |
| 2004/0170916 A1 * | 9/2004 | Kouchiyama et al. | 430/270.1 |
| 2008/0171290 A1 * | 7/2008 | Kouchiyama et al. | 430/289.1 |

FOREIGN PATENT DOCUMENTS

| | | | |
|---|---|---|---|
| JP | 3129349 | * | 6/1991 |
| JP | 11-209558 | | 8/1999 |

* cited by examiner

METHOD OF PRODUCING OPTICAL DISK-USE ORIGINAL AND METHOD OF PRODUCING OPTICAL DISK

The present invention relates to a method for manufacturing a highly accurate optical disc master, and to a method for manufacturing an optical disc produced by using the master.

Recently, recording media that record and store a wide variety of information have been remarkably developing. In particular, regarding a compact recording medium, as the recording system is changed from a magnetic recording medium to an optical recording medium, the recording capacity has been increasing from an order of mega bytes (MB) to an order of giga bytes (GB).

The optical recording medium has changed from Compact Disc™ (CD) to an optical disc in recent years. A read-only optical disc, i.e., a digital versatile disc read-only memory (DVD-ROM), being 12 cm in diameter has an information capacity of 4.7 GB on the single side. This disc can record images that correspond to the recording for two hours in National Television System Committee (NTSC) color television system.

However, as information and communication technology and image processing technology have rapidly developed in recent years, even the above optical disc requires a several fold recording capacity relative to the present capacity. For example, a next-generation optical disc, which is an extension of a digital video disc being 12 cm in diameter, requires an information capacity of 25 GB on the single side. This disc can record images that correspond to the recording for two hours in the digital high vision system.

The optical disc is composed of an optically clear substrate, for example, polycarbonate. Fine irregular patterns such as pits and grooves that represent information signals are formed on one main surface on the substrate. A reflecting film, i.e., a metal thin film composed of, for example, aluminum, is formed on the fine irregular patterns. Furthermore, a protective film is formed on the reflecting film.

In the above recording medium, minimizing the irregular pattern can increase the recording density, and consequently, can increase the recording capacity. A process for manufacturing an optical disc, which relates to the minimizing of the irregular pattern on the optical disc, will now be described with reference to FIG. 10.

A resist layer 91 is uniformly formed on a substrate 90 (FIG. 10(a)).

Subsequently, the resist layer 91 is selectively exposed according to a signal pattern (FIG. 10(b)). The resist layer 91 is developed to produce a master 92 having a predetermined irregular pattern thereon (FIG. 10(c)). An example of the known method for producing this master will now be described.

A glass substrate having a sufficiently smooth surface is used as the substrate. The substrate is disposed on a rotatable table. While the glass substrate is rotated at a predetermined speed, a photosensitive resist, i.e., photo resist (organic resist) is applied on the substrate. The glass substrate is further rotated in order to spread the photo resist. Thus, the resist layer is formed on the whole area by spin coating. Subsequently, the photo resist is exposed with recording laser such that the photo resist has a predetermined pattern. Thus, a latent image corresponding to information signals is formed on the substrate. Then, the substrate is developed with a developer to remove the exposed areas or the unexposed areas of the photo resist. In this way, a resist master is produced.

The resist master 92 includes the glass substrate and the photo resist layer formed thereon and having the predetermined irregular pattern.

Then, a metallic nickel film is formed on the irregular pattern of the resist master 92 by electroforming (FIG. 10(d)). The nickel film is lifted off from the resist master 92. Subsequently, a predetermined process is performed to produce a molding stamper 93 having the irregular pattern of the resist master 92 (FIG. 10(e)).

Polycarbonate, which is a thermoplastic resin, is molded by injection molding using the molding stamper 93 to form a resin disc substrate 94 (FIG. 10(f)). The stamper is removed (FIG. 10(g)), and then a reflecting film 95 composed of an aluminum alloy (FIG. 10(h)) and a protective film 96 are formed on the irregular surface of the resin disc substrate 94 to produce an optical disc (FIG. 10(i)).

As described above, in order to produce the fine irregular pattern on the optical disc, the pattern is reproduced on the substrate accurately and quickly by the use of the stamper on which the fine irregular pattern is formed with high precision. In terms of the precedent process, the precision of the fine irregular pattern on the optical disc depends on the cutting process, i.e., the process in which the resist layer is exposed with laser to form the latent image.

For example, according to the above read-only DVD (DVD-ROM) having the information capacity of 4.7 GB, cut portions are formed on the stamper such that a pit line (0.4 μm in the minimum pit length, 0.74 μm in the track pitch) is formed in a spiral shape. In order to form the cut portions, laser having the wavelength of 413 nm and an objective lens having the numerical aperture NA of about 0.90 (for example 0.95) are used.

The minimum pit length P (μm) to be exposed is represented by following Formula (1):

$$P = K \cdot \lambda / NA \tag{1}$$

wherein λ (μm) represents a wavelength of the light source, NA represents a numerical aperture of the objective lens, and K represents a proportionality constant.

The wavelength λ of the light source and the numerical aperture NA of the objective lens depend on the specification of laser equipment, and the proportionality constant K depends on the combination of the laser equipment and the resist master.

When the optical disc having the information capacity of 4.7 GB is produced, the wavelength is 0.413 μm, the numerical aperture NA is 0.90, and the minimum pit length is 0.40 μm. Therefore, according to Formula (1), the proportionality constant K is 0.87.

On the other hand, in order to meet the demand for the optical disc having the information capacity of 25 GB, the minimum pit length must be decreased to 0.17 μm, and the track pitch must be decreased to about 0.32 μm.

In general, shortening the wavelength of the laser is effective for nanofabrication of the irregular pattern (i.e., the formation of submicron pits). As described above, in order to meet the demand for the high-density optical disc having the information capacity of 25 GB on the single side, the minimum pit length must be decreased to about 0.17 μm. In this case, if the proportionality constant K is 0.87 and the numerical aperture NA is 0.95, the light source must include laser equipment having the wavelength λ of 0.18 μm.

ArF laser having a wavelength of 193 nm has been developing so that the laser is used as a light source for semiconductor lithography for the next-generation. The above wavelength, i.e., 0.18 μm, is shorter than the wavelength of the ArF laser. An exposure system that achieves an exposure with such a short wavelength is very expensive because the exposure system requires not only the special laser used as the light source, but also special optical parts such as a special lens. Accordingly, the above method for achieving nanofabrication, in which the wavelength λ during exposure is shortened and the numerical aperture NA of the objective lens is increased in order to increase the optical resolution, is not extremely suitable for producing inexpensive devices. The reason is that, as the patterns become fine, the existing exposure systems cannot be used and more expensive exposure systems must be introduced instead. Accordingly, even if the performance of the laser equipment in an exposure system is improved, the increase of the recording capacity in the optical disc is limited.

In a general present exposing step, organic resists such as novolac resists and chemically amplified resists are exposed with ultraviolet rays as the light source. The organic resists are all-purpose and widely used in the photolithographic field. Unfortunately, the patterns on the boundaries between the exposed areas and the unexposed areas are not clear because of the high molecular weight of the organic resists. Accordingly, in terms of the precision, the organic resists cannot be used for the nanofabrication of the optical disc having a high capacity level of 25 GB.

On the other hand, inorganic resists, in particular, amorphous inorganic resists provide clear patterns on the boundaries between the exposed areas and the unexposed areas because the minimum structure unit of the inorganic resist is an atomic level. Therefore, the inorganic resists are suitable for the precise nanofabrication compared with the organic resists. The use of the inorganic resists is promising to produce the optical disc having a high capacity. For example, in a known nanofabrication process, a resist material such as $MoO_3$ or $WO_3$ is exposed with ion beam as the light source (see, for example, Nobuyoshi Koshida, Kazuyoshi Yoshida, Shinichi Watanuki, Masanori Komuro, and Nobufumi Atoda: "50-nm Metal Line Fabrication by Focused Ion Beam and Oxide Resists", Jpn. J. Appl. Phys. Vol. 30 (1991) pp. 3246). In other known process, a resist material composed of $SiO_2$ is exposed with electron beam as the light source (see, for example, Sucheta M. Gorwadkar, Toshimi Wada, Satoshi Hiraichi, Hiroshi Hiroshima, Kenichi Ishii, and Masanori Komuro: "$SiO_2$/c-Si Bilayer Electron-Beam Resist Process for Nano-Fabrication", Jpn. J. Appl. Phys. Vol. 35 (1996) pp. 6673). Furthermore, a process has been studied in which a resist material composed of chalcogenide glasses is exposed with laser having the wavelength of 476 nm and 532 nm, and a mercury xenon lamp that radiates ultraviolet rays as the light source (see, for example, S. A. Kostyukevych: Investigations and modeling of physical processes in inorganic resists for the use in UV and laser lithography", SPIE Vol. 3424 (1998) pp. 20).

As described above, when ion beam or electron beam is used as the light source of the exposure, many kinds of inorganic resist material can be used in combination. In addition, the fine convergence of the electron beam or the ion beam allows the irregular patterns to be minimized. However, an apparatus having the electron beam or the ion beam as the irradiation source has a complicated structure and is very expensive. Unfortunately, this apparatus is not suitable for producing an inexpensive optical disc.

In terms of the manufacturing cost, ultraviolet rays or visible light, that is, light from, for example, laser equipment installed in the existing exposure system, is preferably used. However, a limited material of the inorganic resists can be patterned to form the cut portions using ultraviolet rays or visible light. Chalcogenide is the only material that can be patterned using ultraviolet rays or visible light so far. The materials of the inorganic resists other than chalcogenide transmit ultraviolet rays or visible light, and barely absorb the light energy. Accordingly, these materials are not suitable for the practical use.

From an economical point of view, the use of the existing exposure system and chalcogenide is a practical combination. Unfortunately, chalcogenide includes materials that are harmful to the human body, for example, $Ag_2S_3$, $Ag—Ag_2S_3$, and $Ag_2Se—GeSe$. Therefore, in terms of the industrial production, the use of chalcogenide is difficult.

As described above, the optical disc having a high recording capacity cannot be manufactured with the existing exposure system so far.

In order to solve the above problems, it is an object of the present invention to provide a method for manufacturing an optical disc master and a method for manufacturing an optical disc having a higher recording capacity. In the method for manufacturing an optical disc master, expensive irradiation equipment having, for example, electron beam or ion beam is not used, instead, a safe resist material suitable for precise nanofabrication and the existing exposure system are used.

SUMMARY OF THE INVENTION

As described above, completely oxidized transition metals (i.e., complete oxides of transition metals) such as $MoO_3$ or $WO_3$ have been used as resist materials for electron beam exposure or ion beam exposure. However, these oxides are clear to ultraviolet rays and visible light, and barely absorb the light. Accordingly, these oxides are not suitable for the nanofabrication that employs ultraviolet rays or visible light as the light source for exposure.

As a result of intensive study, the present inventors have found the following phenomena: A slight shift of oxygen content from the stoichiometric composition of the transition metal oxides dramatically increases the absorption of ultraviolet rays or visible light. Absorbing ultraviolet rays or visible light changes chemical properties of the transition metal oxides. Therefore, the metal oxides can be applied to the resist material, and to a method for producing an optical disc master. In other words, the proportionality constant K is improved in the above Formula (1), thereby decreasing the minimum pit length P.

A method for manufacturing an optical disc master according to the present invention is based on the above fact. The method for manufacturing an optical disc master includes the steps of forming a resist layer composed of a resist material including an incompletely oxidized transition metal (i.e., incomplete oxide of a transition metal) on a substrate, the oxygen content of the incomplete oxide being smaller than the oxygen content of the stoichiometric composition corresponding to the valence of the transition metal; selectively exposing the resist layer according to a recording signal pattern; and developing the resist layer to form a predetermined irregular pattern.

According to a method for manufacturing an optical disc of the present invention, an optical disc master is used to produce the disc having an irregular pattern thereon, the master being produced by the steps of forming a resist layer composed of a resist material including an incomplete oxide of a transition metal on a substrate, the oxygen content of the incomplete oxide being smaller than the oxygen content of the stoichiometric composition corresponding to the valence of the transition metal; selectively exposing the resist layer according to the recording signal pattern; and developing the resist layer to form the predetermined irregular pattern.

The above incomplete oxide of a transition metal is defined as a compound wherein the oxygen content of the oxide is shifted to be smaller than the oxygen content of the stoichiometric composition corresponding to a valence of the transition metal. In other words, the oxygen content of the incomplete oxide of a transition metal is smaller than the oxygen content of the stoichiometric composition corresponding to the valence of the transition metal.

If the incomplete oxide includes a plurality of kinds of transition metals, one kind of transition metal atoms that have a crystal structure are partly replaced with other transition metal atoms. In this case, the determination of the incomplete oxides depends on the fact if the oxygen content of the oxide is smaller than the oxygen content of the stoichiometric compositions of the plurality of kinds of the transition metal.

According to the present invention, since the incomplete oxide of a transition metal used as the resist material absorbs ultraviolet rays or visible light, the resist can be exposed without using a special light source for exposure, such as electron beam or ion beam. Furthermore, since the incomplete oxide of a transition metal has a low molecular weight, the boundaries between the unexposed areas and the exposed area are clear compared with an organic resist having a high molecular weight. Accordingly, the use of the incomplete oxide of a transition metal provides a highly precise resist pattern.

BRIEF DESCRIPTION OF THE DRAWINGS

FIGS. 4A and 4B show examples of irradiation pulses, and FIG. 4C shows an example of continuous light.

FIG. 5A illustrates a step of forming a first resist layer and a second resist layer, FIG. 5B illustrates a step of patterning the first resist layer, FIG. 5C illustrates a step of etching the second resist layer, and FIG. 5D illustrates a step of removing the first resist layer.

DETAILED DESCRIPTION OF THE PRESENTLY PREFERRED EMBODIMENTS

Figure 1:
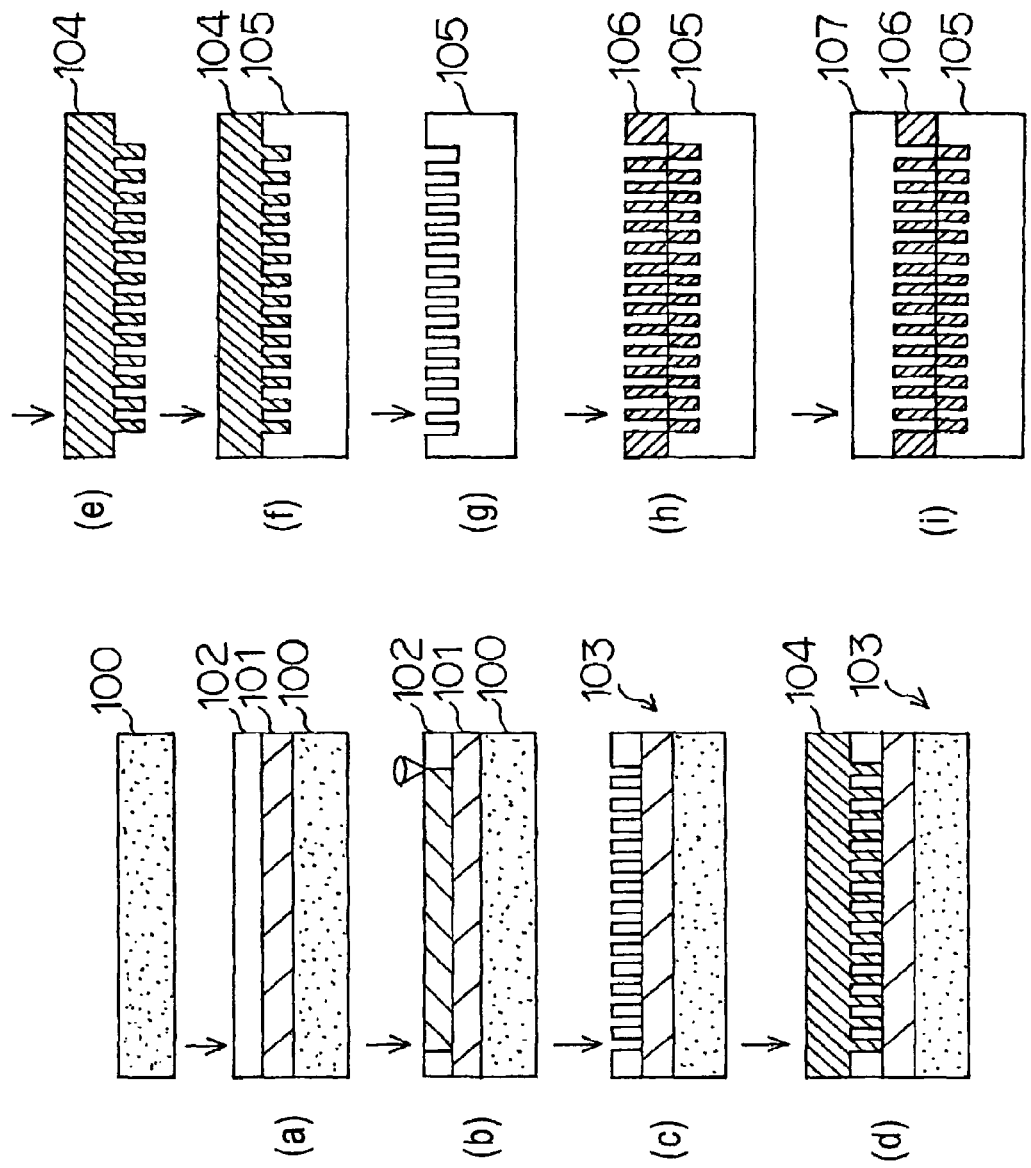
FIG. 1 includes drawings illustrating a manufacturing process of an optical disc according to a method for manufacturing the optical disc of the present invention.

An embodiment of a method for manufacturing an optical disc according to the present invention will now be described in detail with reference to the drawings.

The summary of a manufacturing process according to the method for manufacturing an optical disc of the present invention will now be described with reference to FIG. 1.

A resist layer 102 composed of a predetermined inorganic resist material is uniformly deposited on a substrate 100 by sputtering (a step of forming a resist layer, FIG. 1(a)). The material of the resist layer 102 will be described later in detail. A predetermined interlayer 101 may be formed between the substrate 100 and the resist layer 102 to improve the exposure sensitivity of the resist layer 102. FIG. 1(a) illustrates this case. Although the resist layer 102 may have any thickness, the resist layer 102 preferably has a thickness of 10 to 80 nm.

Subsequently, the resist layer 102 is selectively exposed according to a signal pattern with an exposure system having existing laser equipment (a step of exposing the resist layer FIG. 1(b)). The resist layer 102 is developed to prepare a master 103 having a predetermined irregular pattern thereon (a step of developing the resist layer FIG. 1(c)).

Then, a metallic nickel film is formed on the irregular pattern of the master 103 by electroforming (FIG. 1(d)). The nickel film is lifted off from the master 103, and then a predetermined process is performed to produce a molding stamper 104 having the irregular pattern of the master 103 (FIG. 1(e)).

Polycarbonate, which is a thermoplastic resin, is molded by injection molding using the molding stamper 104 to form a resin disc substrate 105 (FIG. 1(f)). Subsequently, the stamper is removed (FIG. 1(g)), a reflecting film 106 composed of, for example, an aluminum alloy (FIG. 1(h)) and a protective film 107 having a thickness of about 0.1 mm are formed on the irregular surface of the resin disc substrate 105 to produce an optical disc (FIG. 1(i)). The steps of manufacturing the optical disc using the resist master (i.e., the master having the resist thereon) may be performed with a known art.

[Resist Materials]

The resist material used for the resist layer 102 is composed of incomplete oxide of a transition metal. The incomplete oxide of a transition metal is defined as a compound wherein the oxygen content of the oxide is shifted to be smaller than the oxygen content of the stoichiometric composition corresponding to a valence of the transition metal. In other words, the oxygen content of the incomplete oxide of a transition metal is smaller than the oxygen content of the stoichiometric composition corresponding to the valence of the transition metal.

A chemical formula $MoO_3$ will now be described as an example of the incomplete oxide of a transition metal. The oxidation state of the chemical formula $MoO_3$ is converted into a composition ratio of $Mo_{1-x}O_x$. When the value x is 0.75 (i.e., x=0.75), the compound is a complete oxide. When Disclosure of Invention the value x is represented by $0<x<0.75$, the compound is an incomplete oxide in which the oxygen content of the compound is smaller than the oxygen content of the stoichiometric composition.

Some transition metals can form its oxides that have different valences. In this case, if the actual oxygen content of an oxide is smaller than the oxygen content of the stoichiometric composition corresponding to the valence of the transition metal, the compound is defined as an incomplete oxide according to the present invention. For example, the oxides of molybdenum (Mo) include not only the above trivalent oxide ($MoO_3$), which is the most stable compound, but also a monovalent oxide (MoO). In this case, the oxidation state is converted into a composition ratio of $Mo_{1-x}O_x$. When the value x is represented by $0<x<0.5$, the compound is an incomplete oxide in which the oxygen content of the compound is smaller than the oxygen content of the stoichiometric composition. The valence of the transition metal oxide can be determined with a commercially available analytical instrument.

The incomplete oxide of the transition metal absorbs ultraviolet rays or visible light. Irradiating ultraviolet rays or visible light changes chemical properties of the incomplete oxide of the transition metal. Consequently, as described later in detail, in spite of an inorganic resist, the exposed areas and the unexposed areas of the resist have different etching rates in the developing step. That is, the resist has selectivity. Furthermore, according to the resist material composed of the incomplete oxide of the transition metal, since the size of the microparticle of the resist film material is small, the pattern on the boundaries between the exposed areas and the unexposed areas become clear. Accordingly, the resolution can be improved.

Since the property of the resist material composed of the incomplete oxide of the transition metal depends on the degree of the oxidation, the optimum degree of the oxidation must be appropriately selected. If the oxygen content of the incomplete oxide of the transition metal is considerably smaller than that of the stoichiometric composition of the complete oxide, some disadvantages arise. For example, the exposing step requires a high irradiation power and the developing step takes a long time. Preferably, the oxygen content of the incomplete oxide of the transition metal is slightly smaller than that of the stoichiometric composition of the complete oxide.

Examples of the transition metal used as the resist material include Ti, V, Cr, Mn, Fe, Nb, Cu, Ni, Co, Mo, Ta, W, Zr, Ru, and Ag. Preferably, Mo, W, Cr, Fe, and Nb are used. More preferably, Mo and W are used in terms of considerable chemical change by irradiation of ultraviolet rays or visible light.

According to the present invention, the incomplete oxide of the transition metal may be an incomplete oxide of a first transition metal. The incomplete oxide of the first transition metal may further include a second transition metal. The incomplete oxide of the first transition metal may further include a plurality of kinds of transition metals. The incomplete oxide of the first transition metal may further include at least one element other than transition metals. According to the present invention, in particular, the incomplete oxide of the transition metal preferably includes a plurality of kinds of metal elements.

If the incomplete oxide of the first transition metal further includes a second transition metal, or further includes at least three transition metals, the first transition metal atoms that have a crystal structure are partly replaced with other transition metal atoms. In this case, the determination of the incomplete oxides depends on the fact if the oxygen content of the oxide is smaller than the oxygen content of the stoichiometric compositions of the plurality of kinds of the transition metals.

Examples of the element other than transition metal include at least one element selected from the group consisting of, for example, Al, C, B, Si, and Ge. The use of at least two kinds of transition metals in combination or adding at least one element other than transition metal decreases the crystal grain size of the incomplete oxides of the transition metal. Accordingly, the boundaries between the exposed areas and unexposed areas become clearer, thereby significantly improving the resolution. The exposure sensitivity can be also improved.

The above resist material can be produced in an atmosphere including argon and oxygen by sputtering using a target containing the predetermined transition metal. For example, the content of the oxygen is 5% to 20% of the total gas flow introduced in a chamber at a normal sputtering gas pressure (1 to 10 Pa)

[Method for Producing Optical Disc Master]

A method for manufacturing an optical disc master, the method being a backbone of the method for manufacturing the optical disc, will now be described in detail.

An embodiment of the method for manufacturing the optical disc master according to the present invention, for example, includes the steps of forming a resist material composed of an incomplete oxide of a transition metal on a substrate to form a resist layer; selectively exposing the resist layer; and developing the resist layer to produce a master having a predetermined irregular pattern thereon, as described above. Each step will now be described in detail.

[Step of Forming Resist Layer]

A resist layer composed of an incomplete oxide of a transition metal is formed on a substrate having a sufficiently smooth surface. Examples of the method include a deposition by sputtering in an atmosphere including argon and oxygen with a sputtering target composed of the transition metal. In this case, changing the content of oxygen gas in vacuum can control the degree of oxidation of the incomplete oxide of the transition metal. When incomplete oxides of transition metals including at least two kinds of transition metals are deposited by sputtering, the substrate is constantly rotated on the different kinds of sputtering targets to mix the plurality of kinds of transition metals. The mixing ratio of the transition metals is controlled by individually changing the sputtering power.

In order to deposit the resist layer composed of the incomplete oxide of the transition metal, as described above, the sputtering may be performed in an atmosphere containing oxygen with the metal target. Alternatively, the sputtering may be performed in argon atmosphere as usual with a target composed of the incomplete oxide of the transition metal that has the predetermined oxygen content.

Furthermore, in addition to sputtering, the resist layer composed of the incomplete oxide of the transition metal can be readily deposited by vapor deposition.

Examples of the substrate include glass; a plastic such as polycarbonate; silicon; alumina-titanium carbide; and nickel.

Although the resist layer may have any thickness, the resist layer may have a thickness of, for example, 10 to 80 nm.

[Step of Exposing Resist Layer]

The substrate after deposition of the resist layer (hereinafter referred to as resist substrate 1) is disposed on a turntable 11 of an exposure system shown in FIG. 2 such that the face having the resist layer thereon is placed on the upper side.

The exposure system includes a beam source 12 that emits light, such as laser, to expose the resist layer. The beam source 12 irradiates the resist layer of the resist substrate 1 with laser. The laser is focused on the resist layer through a collimator lens 13, a beam splitter 14, and an objective lens 15. According to this exposure system, reflected light from the resist substrate 1 is converged on a split photo detector 17 through the beam splitter 14 and a converging lens 16. The split photo detector 17 detects the reflected light from the resist substrate 1, generates a focus error signal 18 based on the detection result, and sends the focus error signal 18 to a focus actuator

19. The focus actuator 19 controls the position of the objective lens 15 in the vertical direction. The turntable 11 includes a feeding attachment (not shown in the figure) to change the exposing position of the resist substrate 1 precisely. According to this exposure system, the exposure or the focusing is performed while a laser driving circuit 23 is controlling the beam source 12 based on a data signal 20, a reflected light intensity signal 21, and a tracking time difference signal 22. Furthermore, a spindle motor control system 24 is disposed at the central axis of the turntable 11. The spindle motor control system 24 determines an optimal revolution speed of a spindle based on the radial position of the optical system and a desired linear velocity, thus controlling a spindle motor.

In an exposing step where a known organic resist is used as a resist layer, the focusing to the resist layer is not performed with the exposing light source itself. The reason is as follows: The chemical property of the organic resist is continuously changed by exposure. Therefore, even though light for focusing is faint, the resist layer composed of the organic resist is unnecessarily exposed by the irradiation. Accordingly, additional light source that emits light having a wavelength to which the organic resist is not sensitive, for example, a red light source that emits light having a wavelength of 633 nm, is prepared to perform the focusing. As described above, since the exposure system used for the known organic resist uses two light sources that emit light having different wavelength, the exposure system requires an optical system that can perform wavelength division. Unfortunately, the exposure system requires a very complicated optical system and the cost of the exposure system is increased. Furthermore, in the exposure system used for the known organic resist, the resolution by the focus error signal, which is used for controlling the position of the objective lens in the vertical direction, is proportional to the wavelength of the light source (for example, wavelength: 633 nm) used for the detection. Accordingly, the resolution is not as high as a resolution accomplished by the light source used for the exposure. Unfortunately, a precise and stable focusing cannot be performed.

Figure 3:
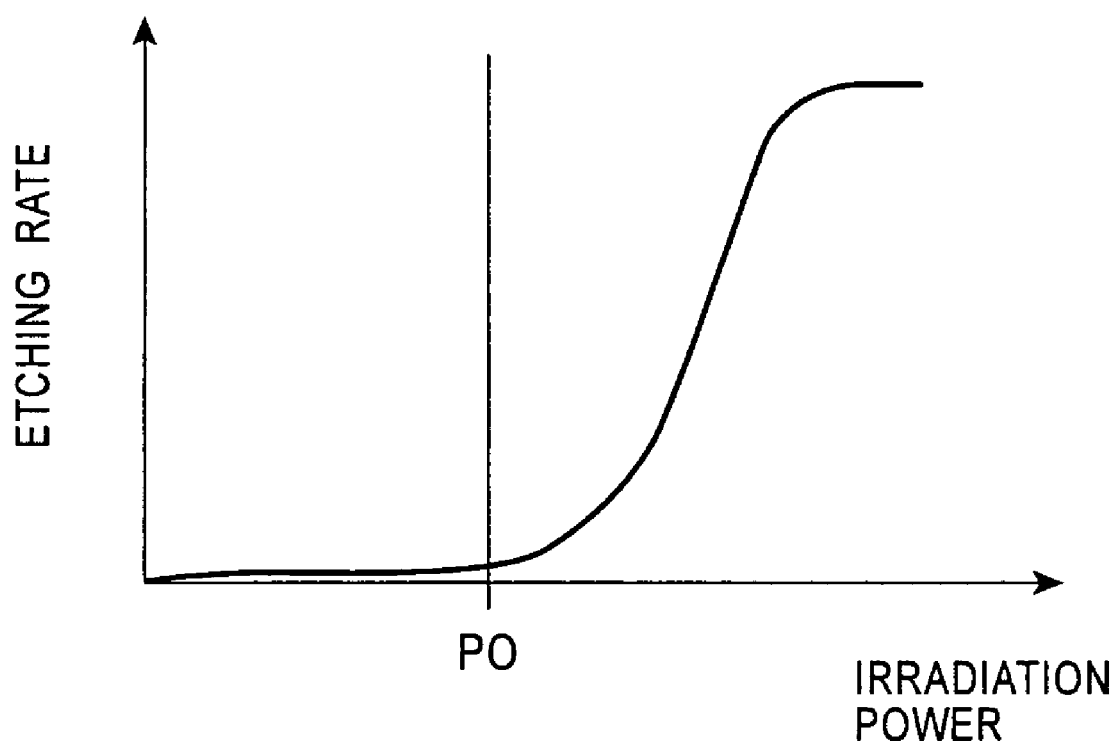
FIG. 3 is a characteristic graph showing a relationship of an irradiation power of the light source used for the exposure and a difference of the etching rate between an exposed area and an unexposed area in the case where a resist layer composed of a resist material according to the present invention is exposed.

On the other hand, according to the inorganic resist material of the present invention, the chemical property of the resist changes very rapidly in the exposure. FIG. 3 shows the relationship of an irradiation power of a light source used for the exposure and a difference of the etching rate (i.e., contrast) between an exposed area and an unexposed area. When the irradiation power is less than an irradiation threshold power P0 at which the exposure starts, even repeated irradiation does not cause unnecessary exposure. Accordingly, the focusing can be performed with the exposing light source itself at an irradiation power smaller than the P0. According to the method for manufacturing the optical disc master of the present invention, the exposure system does not require an optical system that performs wavelength division, thereby decreasing the cost of the exposure system. Furthermore, since a highly precise focusing that corresponds to the wavelength in exposure can be achieved, an accurate nanofabrication can be performed. The resist material of the present invention, which is an inorganic resist, is not sensitized with faint light having an irradiation power smaller than the irradiation threshold power P0. Therefore, unlike the process in which the known organic resist is used, cutting ultraviolet light in room lighting is not necessary.

As described above, the focusing is performed with light having the irradiation power smaller than the irradiation threshold power P0, and the turntable 11 is then moved at a desired radial position. In this case, the optical system including such as the objective lens 15 is fixed in position in the longitudinal direction, whereas the turntable 11 is moved in order to change the exposure position of the resist substrate 1. Alternatively, of course, the turntable 11 having the resist substrate 1 thereon may be fixed, whereas the position of the optical system may be changed.

Subsequently, the beam source 12 radiates laser on the resist layer, and the turntable 11 is rotated at the same time in order to expose the resist layer. In this exposing step, in order to form a fine irregular latent image, the turntable 11 is continuously moved in the radial direction of the resist substrate 1 by a small pitch, while the turntable 11 is kept rotating. For example, in order to produce a recording disc, a spiral pregroove is formed as the fine irregular latent image. In order to produce an optical disc, irregular pits representing information data, and a meandering pregroove are formed as the fine irregular latent image. In order to produce a disc that has concentric tracks, for example, a magnetic hard disc, the turntable 11 or the optical system is moved not continuously but stepwise.

Figure 4A:
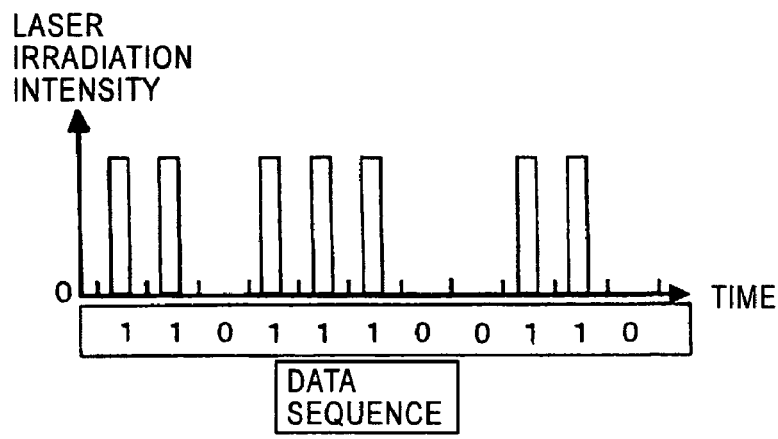
FIGS. 4A to 4C are characteristic graphs showing an example of an irradiation pattern in the exposing step.
Figure 4B:
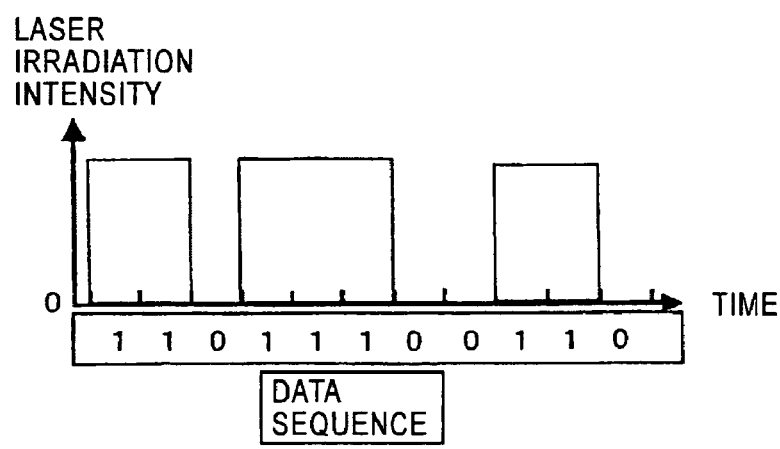
Figure 4C:
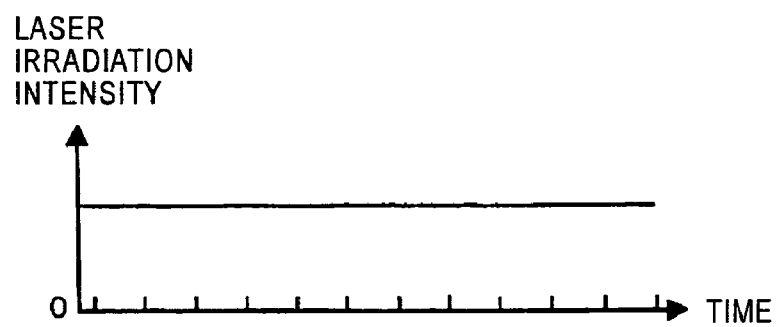

According to the conditions described above, irradiation pulses or continuous light having a desired power, which is larger than or equal to the irradiation threshold power P0, is irradiated in order on the resist layer from a desired position of the resist substrate 1 corresponding to the pits or the pregroove based on the information data. Thus, the exposure is performed. FIGS. 4A and 4B show examples of irradiation pulses, and FIG. 4C shows an example of continuous light.

According to the resist material of the present invention composed of an incomplete oxide of a transition metal, the chemical property of the resist is changed by irradiation of ultraviolet rays or visible light having a power larger than or equal to the irradiation threshold power P0. Consequently, the exposed areas and the unexposed areas of the resist have different etching rates in an alkali or an acid. That is, the resist has selectivity.

A low irradiation power can form a short and narrow pit. However, an excessively low irradiation power gets close to the irradiation threshold power P0, and therefore, prevents the stable pattern formation. Accordingly, the exposure must be appropriately performed with an optimal irradiation power.

The present inventors have verified that the exposure using a red semiconductor laser that emits light having a wavelength of 660 nm and a mercury lamp that emits light having peaks at wavelengths of 185 nm, 254 nm, and 405 nm provides the resist material of the present invention with the selectivity, and this process can form a fine pit pattern.

[A Step of Developing Resist Layer]

Subsequently, the resist substrate 1 having the exposed pattern as described above is developed to produce a resist master used for producing an optical disc. The resist master has a fine irregular surface including the pits or the pregroove corresponding to the predetermined exposure pattern.

The step of developing includes a wet process using, for example, an acidic solution or an alkaline solution. This process provides the resist layer with selectivity. The step of developing may be appropriately changed depending on, for example, the intended use, the application, and the device and equipment. Examples of the alkaline developer include a solution of tetramethylammonium hydroxide; and solutions of inorganic alkali such as KOH, NaOH, and $Na_2CO_3$. Examples of the acidic developer include hydrochloric acid, nitric acid, sulfuric acid, and phosphoric acid. The present inventors have verified that in addition to the wet process, a dry process such as plasma etching, i.e., reactive ion etching (RIE) can be also used for the development in which the kinds of the gas and the mixing ratio of a plurality of gases are controlled.

A method for controlling the exposure sensitivity will now be described. Take an example where the oxidation state of a transition metal oxide represented by chemical formula $WO_3$ is converted into a composition ratio of $W_{1-x}O_x$. When the value x is represented by $0.1<x<0.75$, a high exposure sensitivity can be achieved. When the value x is 0.1, this value is a critical value in which, for example, the exposing step requires a high irradiation power and the developing process takes a long time disadvantageously. When the value x is in the range of about 0.4 to about 0.7, the highest exposure sensitivity can be achieved.

Take an example where the oxidation state of a transition metal oxide represented by chemical formula $MoO_3$ is converted into a composition ratio of $Mo_{1-x}O_x$. When the value x is represented by $0.1<x<0.75$, a high exposure sensitivity can be achieved. When the value x is 0.1, this value is a critical value in which, for example, the exposing step requires a high irradiation power and the developing process takes a long time disadvantageously. When the value x is in the range of about 0.4 to about 0.7, the highest exposure sensitivity can be achieved.

Furthermore, take an example where the oxidation state of a transition metal oxide represented by chemical formula MoO is converted into a composition ratio of $Mo_{1-x}O_x$. When the value x is represented by $0.1<x<0.5$, a high exposure sensitivity can be achieved. When the value x is 0.1, this value is a critical value in which, for example, the exposing step requires a high irradiation power and the developing process takes a long time disadvantageously.

A high exposure sensitivity of the resist material, for example, advantageously decreases the irradiation power during exposure and decreases the exposing time corresponding to the pulse width and the linear velocity. However, excessively high exposure sensitivity disadvantageously causes unnecessary exposure during focusing, and causes an adverse effect in the exposure due to the lighting environment in the processing room. Accordingly, optimal exposure sensitivity is appropriately selected depending on the application. In order to control the exposure sensitivity of the resist material according to the present invention, the oxygen content of the material is increased or decreased; alternatively, a second transition metal is effectively added to an incomplete oxide of a first transition metal. For example, adding molybdenum (Mo) to $W_{1-x}O_x$ can improve the exposure sensitivity by about 30%.

Furthermore, in addition to the change of the resist material composition, the selection of the substrate material and pretreatments for exposure on the substrate can also control the exposure sensitivity. The dependency of the substrate material to the exposure sensitivity was investigated using quartz, silicon, glass, and a plastic (polycarbonate). As a result, the exposure sensitivity depended on the substrate material, more specifically; the highest exposure sensitivity was achieved with the plastic, subsequently, glass, quartz, and silicon, in this order. This order corresponds to the order of the thermal conductivity. A substrate having a small thermal conductivity achieves high exposure sensitivity. The reason is as follows: The use of the substrate having a small thermal conductivity significantly increases the temperature of the resist material during exposure. Subsequently, as the temperature increases, the chemical property of the resist material is significantly changed.

Examples of the pretreatments for exposure include a formation of an interlayer disposed between the substrate and the resist material, a heat treatment, and ultraviolet irradiation.

In particular, when a substrate having a large thermal conductivity, for example, silicon wafer composed of single crystal silicon is used, an interlayer having a relatively small thermal conductivity is preferably formed on the substrate to appropriately improve the exposure sensitivity. The reason is that the interlayer enhances the thermal storage in the resist material during exposure. Examples of the material of the interlayer having a small thermal conductivity include amorphous silicon, silicon dioxide ($SiO_2$), silicon nitride (SiN), and alumina ($Al_2O_3$). The interlayer may be formed by sputtering or other vacuum depositions.

UV curable resin layer having a thickness of 5 μm was formed on a quartz substrate by spin coating. Ultraviolet rays were then irradiated to cure the liquid resin. The exposure sensitivity in the above substrate was higher than that in the untreated quartz substrate. This is also because the thermal conductivity of the UV curable resin is as low as a plastic.

Other pretreatments for exposure, for example, a heat treatment and ultraviolet irradiation can also improve the exposure sensitivity. Although the effect is not perfect, these pretreatments allow the chemical property of the resist material of the present invention to be changed at some level.

As described above, appropriate choices of the resist material composition, the developing condition, and the substrate material can express functions of the resist composed of an incomplete oxide of a transition metal, and having various properties. Furthermore, in order to expand the application of the resist material, a bilayer resist process (i.e., a process using bilayer resist) is very useful. The outline of the bilayer resist process will now be described with reference to FIGS. 5A to 5D.

Figure 5A:
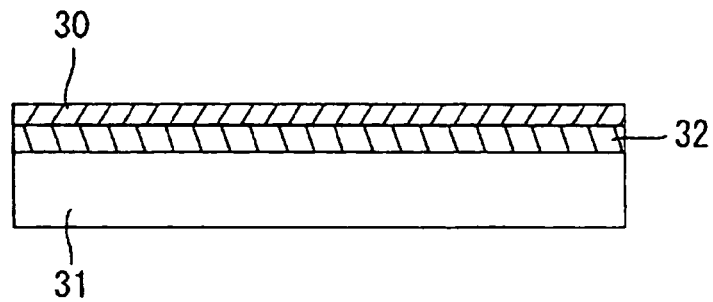
FIGS. 5A to 5D are schematic sectional views of the principal parts illustrating a bilayer resist process.

Referring to FIG. 5A, a first resist layer 30 is composed of an incomplete oxide of a transition metal according to the present invention. Before the deposition of the first resist layer 30, a second resist layer 32 is deposited on a substrate 31. The selectivity of the material of the second resist layer 32 and the selectivity of the incomplete metal oxide of the transition metal in the first resist layer 30 are significantly different.

Figure 5B:
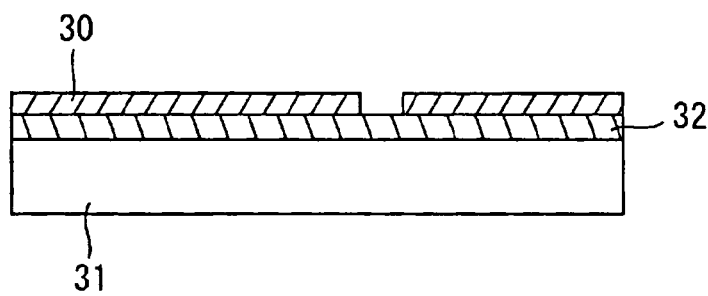

Subsequently, as shown in FIG. 5B, the first resist layer 30 is exposed and is then developed to form a pattern thereon.

Figure 5C:
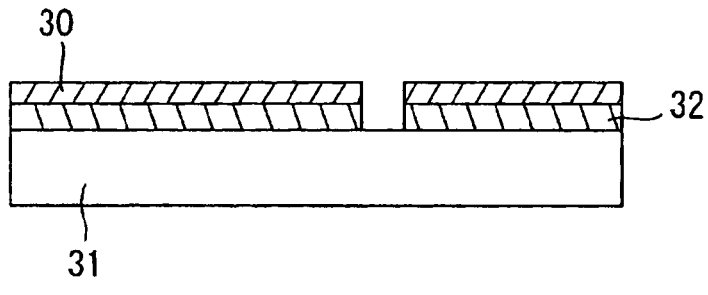

Then, the second resist layer 32 is etched under a high selective etching condition by using the pattern of the first resist layer 30 as a mask. As shown in FIG. 5C, the pattern of the first resist layer 30 is copied on the second resist layer 32.

Figure 5D:
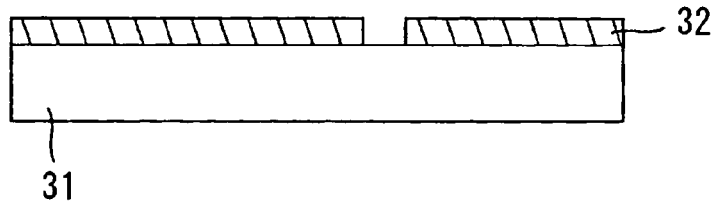

Finally, the first resist layer 30 is removed. Thus, as shown in FIG. 5D, the patterning of the second resist layer 32 is completed.

In order to apply the present invention to the bilayer resist process, for example, the substrate is composed of quartz, the second resist layer is composed of a transition metal such as Cr, and the etching is performed by RIE, i.e., plasma etching with a chlorofluorocarbon gas. In this case, the difference of the selectivity between the incomplete oxide of the transition metal in the first resist layer 30 and the second resist layer 32 becomes approximately the largest.

As described above, the above resist material composed of an incomplete oxide of a transition metal is used in the method for manufacturing an optical disc master of the present invention. Accordingly, even though the resist is composed of an inorganic material, the resist can be advantageously exposed with ultraviolet rays or visible light. This property is absolutely different from that of the known inorganic resist: Since the known inorganic resist is optically clear to ultraviolet rays or visible light, the ultraviolet rays or the visible light cannot be used as the light source for exposure. Subsequently, an expensive exposure system that uses, for example, electron beam or ion beam is essential to expose the known inorganic resist.

Since the use of the ultraviolet rays or visible light achieves a high imaging speed, the time required for the exposure can be significantly decreased, compared with a known method for producing an optical disc master in which the electron beam is used as the light source in order to expose the known inorganic resist.

The use of the inorganic resist material composed of an incomplete oxide of a transition metal provides clear patterns at the boundaries between the exposed areas and the unexposed areas, thus achieving a highly precise nanofabrication. Furthermore, since the focusing can be performed with the exposing light source itself in the exposing step, a high resolution can be achieved.

As described above, according to the method for manufacturing an optical disc master of the present invention, the proportionality constant K in the formula $P=K\cdot\lambda/NA$ is decreased in order to achieve the nanofabrication. Unlike the known method in which the wavelength $\lambda$ in exposure is shortened and the numerical aperture NA of the objective lens is increased to achieve the nanofabrication, the method of the present invention can perform more precise patterning with the existing exposure system. Specifically, according to the present invention, the proportionality constant K can be decreased to less than 0.8, and a minimum fine patterning cycle f of a workpiece can be decreased as follows:

$$f<0.8\lambda/NA$$

According to the present invention, the existing exposure system can be used without further improvement. Therefore, the present invention inexpensively provides an optical disc master on which a more precise nanofabrication is performed.

EXAMPLES

Examples according to the present invention will now be described with reference to the experimental results.

Example 1

In Example 1, a master having a resist thereon (i.e., resist master) used for producing an optical disc was actually produced using a resist material composed of an incomplete oxide of trivalent tungsten (W).

A resist layer composed of an incomplete oxide of tungsten was uniformly deposited by sputtering on a glass substrate having a sufficiently smooth surface. The sputtering was performed with a sputtering target composed of tungsten element in an atmosphere containing argon and oxygen. The content of oxygen gas was changed in order to control the degree of oxidation of the incomplete oxide of tungsten.

The composition of the deposited resist layer was analyzed with an energy dispersive X-ray spectrometer (EDX). When the composition ratio was represented by $W_{1-x}O_x$, the value x was 0.63. The thickness of the resist layer was controlled to be 40 nm. The wavelength dependence of the refractive index was measured by spectroscopic ellipsometry.

Figure 2:
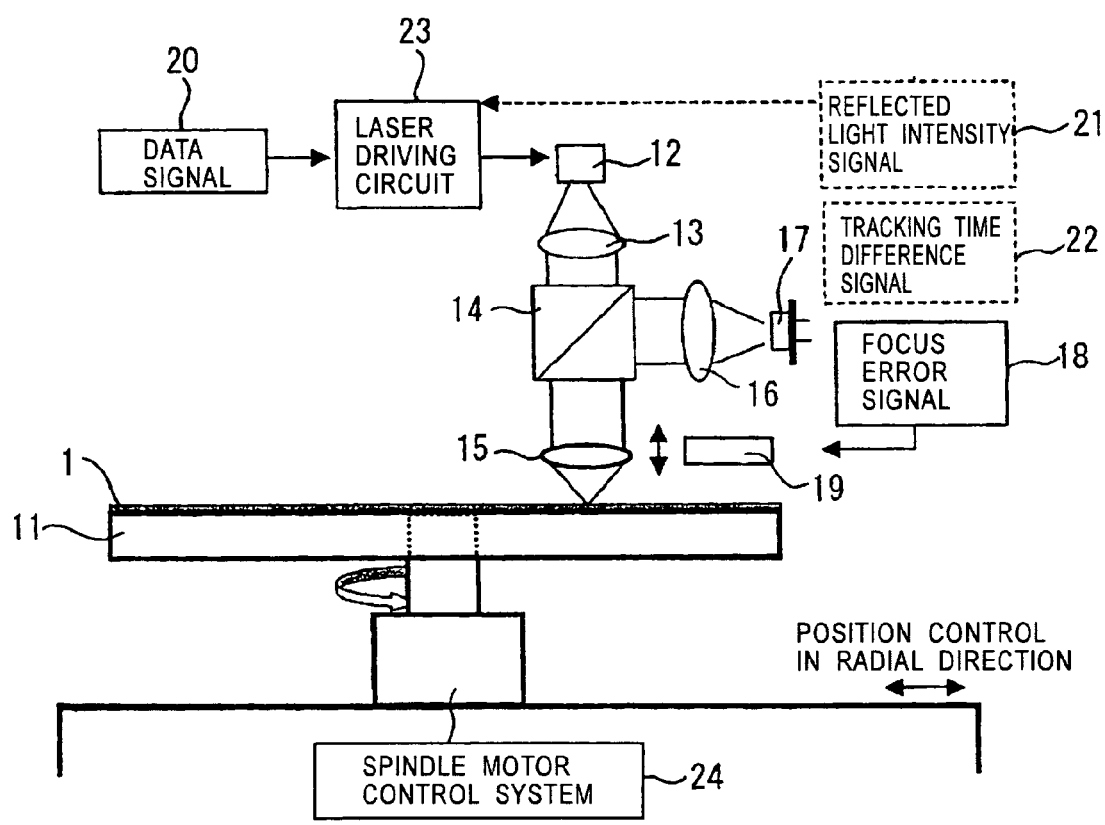
FIG. 2 is a schematic view of an exposure system used in a method for manufacturing an optical disc master according to the present invention.

The substrate having the deposited resist layer thereon, i.e., resist substrate, was disposed on the turntable of the exposure system shown in FIG. 2. While the turntable was rotated at a desired revolution speed, laser having less than the irradiation threshold power was irradiated on the resist layer. The actuator controlled the position of the objective lens in the vertical direction to focus on the resist layer.

Subsequently, the turntable was moved at a desired radial position with the feeding attachment attached to the turntable, whereas the optical system was fixed. Based on the information data, irradiation pulses corresponding to the pits were irradiated on the resist layer to expose the resist layer. In the exposing step, the turntable was continuously moved in the radial direction of the resist substrate by a small pitch, while the turntable was kept rotating. The wavelength in the exposure was 405 nm and the numerical aperture NA of the exposing optical system was 0.95. The linear velocity in the exposing step was 2.5 m/s and the irradiation power was 6.0 mW.

After the exposure, the resist substrate was developed by a wet process with an alkaline developer. In this developing step, the resist substrate was submerged in the developer and ultrasonic waves were applied in order to etch the resist uniformly. After the development, the substrate was sufficiently washed with purified water and isopropyl alcohol and was dried by, for example, blowing air to finish the process. The alkaline developer was a solution of tetramethylammonium hydroxide and the developing time was 30 minutes.

Figure 6:
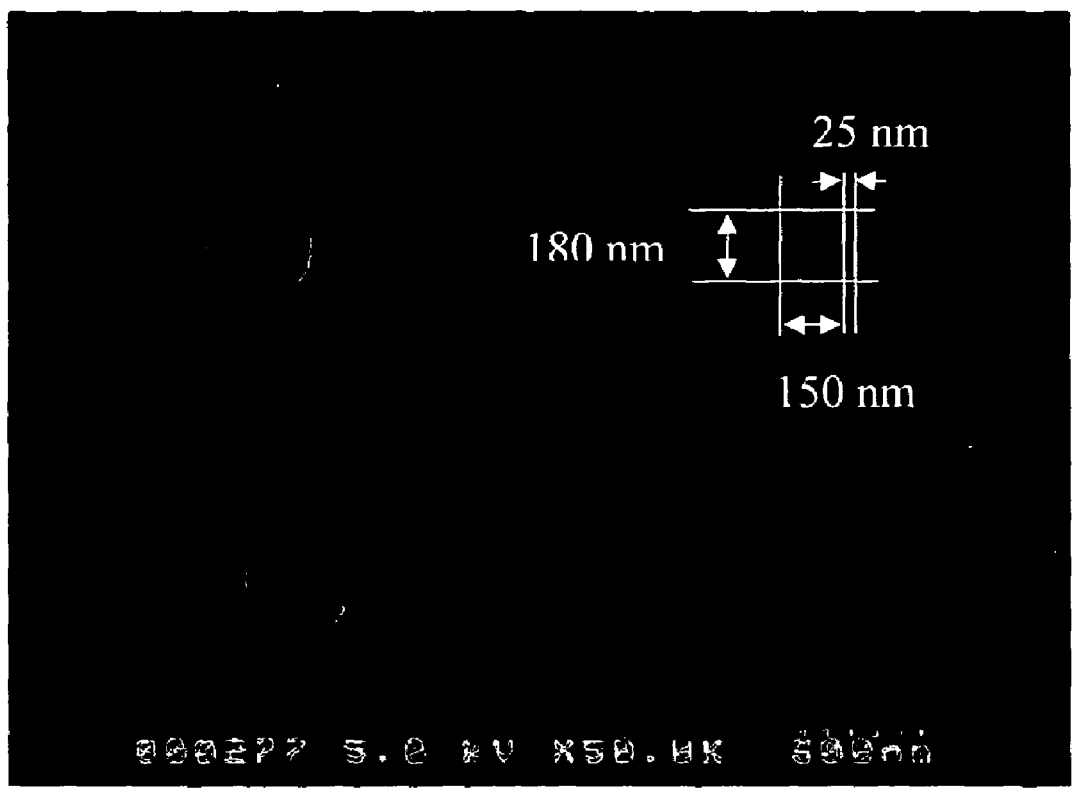
FIG. 6 is an SEM image of a resist layer composed of an incomplete oxide of tungsten (W) after the development.

FIG. 6 is a scanning electron microscope (SEM) image of the resist pattern after the development. Referring to FIG. 6, the pits correspond with the exposed areas. The exposed areas formed hollows relative to the unexposed area on the resist layer. That is, the resist material composed of the incomplete oxide of tungsten was a positive resist. In the resist layer composed of the incomplete oxide of tungsten, the etching rate of the unexposed area was smaller than that of the exposed areas. Accordingly, the unexposed areas of the resist layer had a thickness almost the same as the thickness after the deposition. On the other hand, the exposed areas of the resist layer were removed by etching. Consequently, the surface of the glass substrate was exposed at the exposed areas.

The smallest pit of the four pits shown in FIG. 6 has the width of 0.15 µm and the length of 0.16 µm. Accordingly, the method for manufacturing the optical disc master wherein the resist material of the present invention is used, can significantly improve the resolution relative to the known method with an organic resist, in which the expected pit width is 0.39 µm. Furthermore, FIG. 6 shows that the pit has a very clear edge.

The experimental results also showed that the width and the length of the pit formed after developing depended on the irradiation power and the pulse width of the light source for exposure.

Comparative Example 1

In Comparative Example 1, a resist master used for producing an optical disc was actually produced using a resist material composed of a complete oxide of tungsten, i.e., $WO_3$.

A resist layer composed of the complete oxide of tungsten was deposited by sputtering on a glass substrate. According to the analytical result by the EDX, when the composition ratio of the deposited resist layer was represented by $W_{1-x}O_x$, the value x was 0.75. By the way, the analytical result of electron diffraction by a transmission electron microscope showed that before the exposure, the crystal state of the incomplete tungsten oxide (WO) was amorphous.

This resist layer was exposed with the same irradiation power as in Example 1 or a sufficiently strong irradiation power. However, the selectivity in the resist layer was 1 or less, and the desired pit pattern was not formed. Since the complete oxide of tungsten was optically clear to the light source for exposure, the complete oxide of tungsten barely absorbed the light. The small absorption could not chemically change the resist material.

Example 2

In Example 2, a resist master used for producing an optical disc was actually produced using a resist material composed of an incomplete oxide of trivalent tungsten and trivalent molybdenum according to the manufacturing process shown in FIG. 1. Then, the optical disc was finally manufactured. The operating process will now be described with reference to FIG. 1.

Firstly, an interlayer 101 composed of amorphous silicon and having a thickness of 80 nm was uniformly deposited on a substrate 100 that is a silicon wafer by sputtering. Subsequently, a resist layer 102 composed of an incomplete oxide of tungsten (W) and molybdenum (Mo) was uniformly deposited on the substrate by sputtering (FIG. 1(a)). The sputtering was performed in argon atmosphere with a sputtering target composed of the incomplete oxide of tungsten and molybdenum. According to the analytical result of the deposited resist by the EDX, the ratio of the tungsten and molybdenum in the deposited incomplete oxide of tungsten and molybdenum was 80:20, and the oxygen content of the incomplete oxide was 60 atomic percent. The resist layer had the thickness of 55 nm. The analytical result of electron diffraction by the transmission electron microscope showed that before the exposure, the crystal state of the above incomplete oxide (WMoO) was amorphous.

Figure 7:
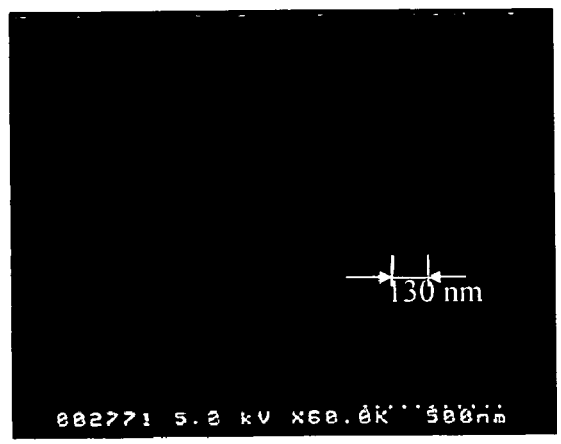
FIG. 7 is an SEM image of a resist layer composed of an incomplete oxide of tungsten (W) and molybdenum (Mo) after the development.

Regarding the step of exposing of the resist layer and the subsequent steps, all conditions except for the exposing condition were the same as in Example 1. Thus, a resist master 103 used for producing the optical disc was produced (FIG. 1(b) and FIG. 1(c)). The exposing condition in Example 2 was as follows:

Wavelength in exposure: 405 nm
Numerical aperture NA of exposing optical system: 0.95
Modulation: 17 PP
Bit length: 112 nm
Track pitch: 320 nm
Linear velocity in exposing step: 4.92 m/s
Irradiation power in exposure: 6.0 mW
Writing system: Simple writing system the same as phase-change disc FIG. 7 is an SEM image showing an example of the resist pattern after the development of the resist master used for producing the optical disc. The resist material composed of the incomplete oxide of tungsten and molybdenum was a positive resist. Referring to FIG. 7, the pits correspond with the exposed areas. The exposed areas formed hollows relative to the unexposed area on the resist layer. The pit length (diameter) was about 130 nm. In other words, this pit length (diameter) was smaller than 170 nm (0.17 µm), which was required for the minimum pit length in the high density optical disc having the recording capacity of 25 GB on the single side. Furthermore, the resist pattern included identically shaped pits with a constant pitch of 300 nm in the pit line direction and with a constant pitch of 320 nm in the track direction. This result showed that the pits were stably formed in this Example.

Then, a metallic nickel film was formed on the irregular pattern of the resist master by electroforming (FIG. 1(d)). The nickel film was lifted off from the resist master. Subsequently, a predetermined process was performed to produce a molding stamper 104 having the irregular pattern of the resist master (FIG. 1(e)).

Polycarbonate, which was a thermoplastic resin, was molded by injection molding using the molding stamper to form a resin disc substrate 105 (FIG. 1(f)). The stamper was removed (FIG. 1(g)), and then a reflecting film 106 composed of an aluminum alloy (FIG. 1(h)) and a protective film 107 having a thickness of 0.1 mm were formed on the irregular surface of the resin disc substrate to produce an optical disc having a diameter of 12 cm (FIG. 1(i)). The above steps of manufacturing the optical disc using the resist master were performed according to the known art.

Figure 8:
FIG. 8 is an SEM image of a pit pattern formed on the surface of an optical disc having a recording capacity of 25 GB that was produced in Example 2.

FIG. 8 is an SEM image showing an example of a pit pattern formed on the surface of the above optical disc. Referring to FIG. 8, pits that were formed on the optical disc corresponded to an actual signal pattern including, for example, pits having the length of 150 nm and linear pits having the width of 130 nm. This result showed that the optical disc had the recording capacity of 25 GB.

Figure 9A:
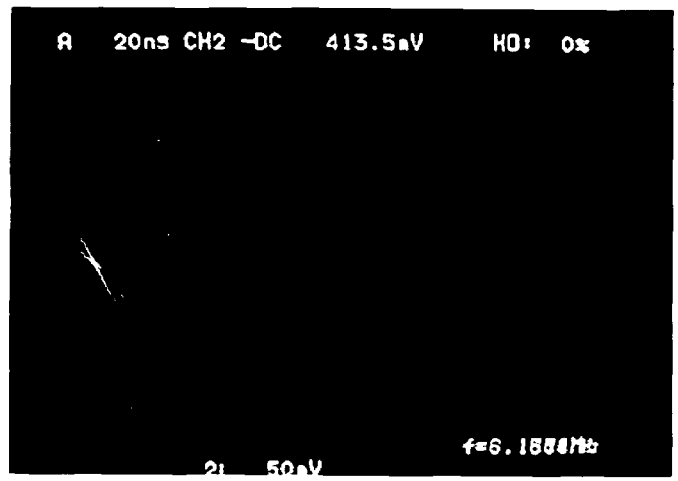
FIGS. 9A to 9C show evaluation results of signals in the optical disc having the recording capacity of 25 GB that was produced in Example 2.
Figure 9B:
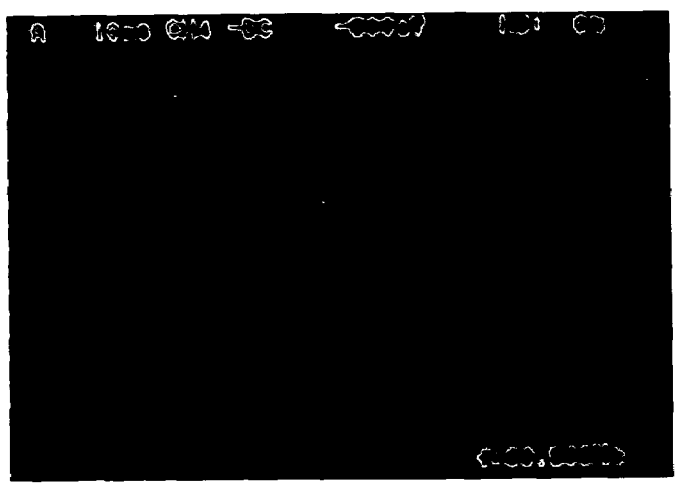
Figure 9C:
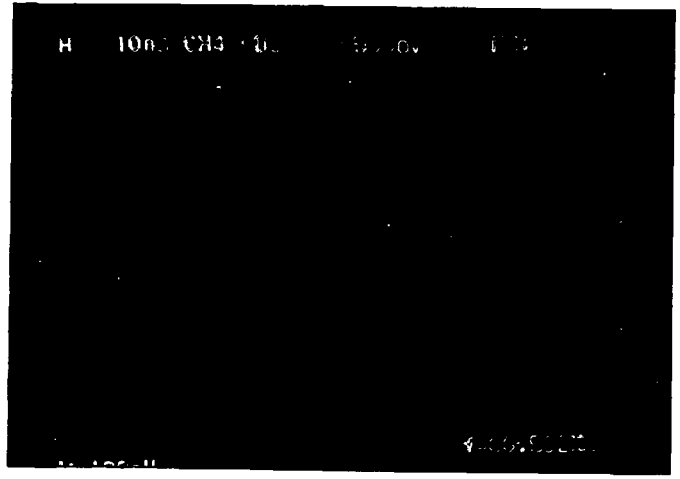
Figure 10:
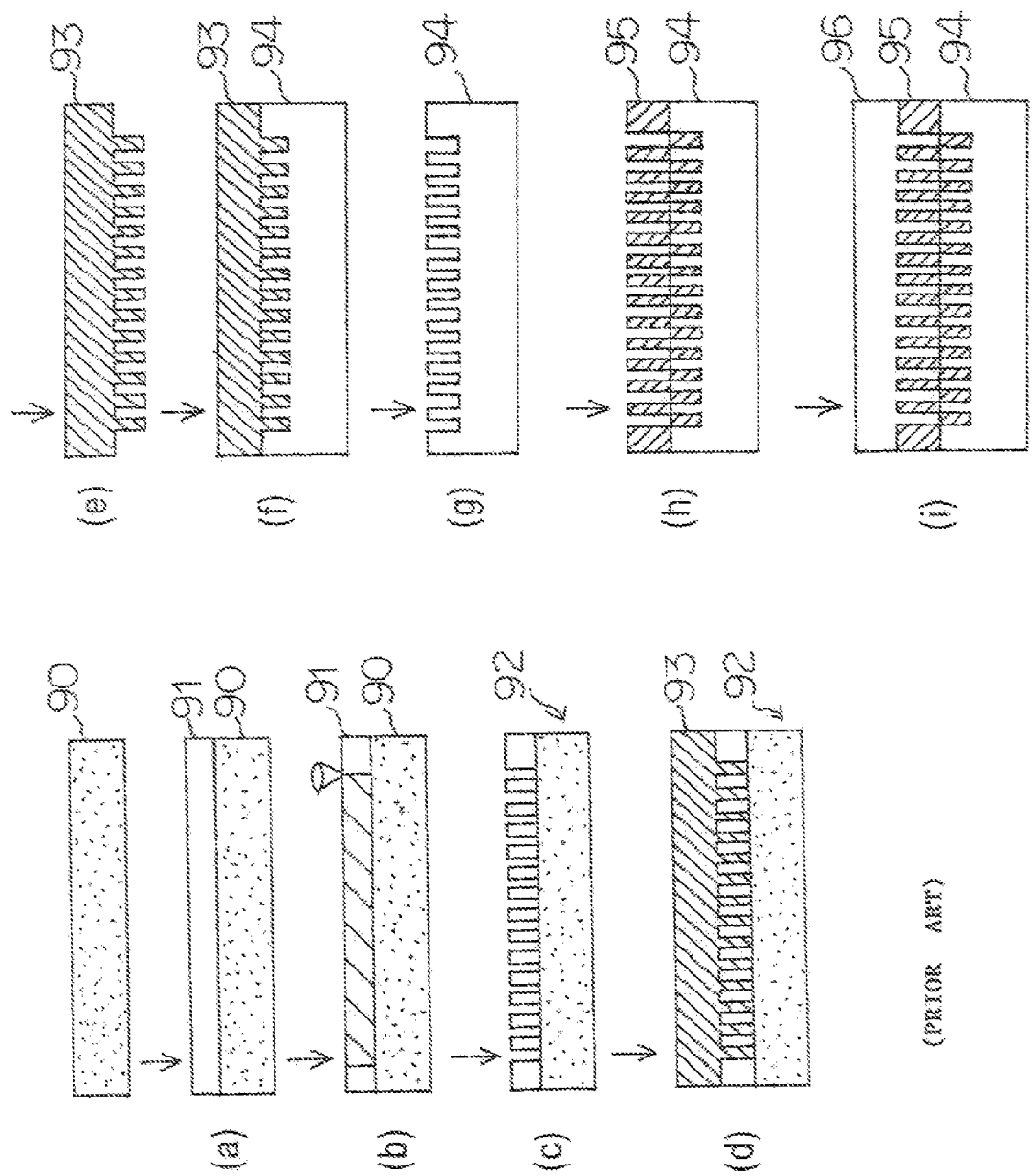
FIG. 10 includes drawings illustrating a known manufacturing process of an optical disc.

Subsequently, the optical disc was read out under the following condition. The RF signals were converted into eye patterns to evaluate the signals. FIGS. 9A to 9C show the results of the signal evaluation.

Tracking servo: Push-pull method
Modulation: 17 PP
Bit length: 112 nm
Track pitch: 320 nm
Linear velocity in readout: 4.92 m/s
Irradiation power in readout: 0.4 mW The jitter value of an eye pattern (FIG. 9B) generated by performing conventional equalization on an untreated readout eye pattern (FIG. 9A) was 8.0%. The jitter value of an eye pattern (FIG. 9C) generated by performing limit equalization on the untreated readout eye pattern (FIG. 9A) was 4.6%. These jitter values were sufficiently small for practical use of the optical disc as a ROM disc having the recording capacity of 25 GB.

The photolithographic technology according to the present invention including the steps from the formation of the resist layer to the development may be applied to produce various devices such as semiconductor devices, e.g. a dynamic random access memory (DRAM), a flash memory, a central processing unit (CPU), and an application specific integrated circuit (ASIC); magnetic devices, e.g. magnetic head; display devices, e.g. a liquid crystal device, an electroluminescence (EL) device, and a plasma display panel (PDP); and optical devices, e.g. an optical recording medium and a light modulation device.

As described above, according to the method for producing an optical disc master of the present invention, the resist layer is composed of an incomplete oxide of a transition metal that absorbs ultraviolet rays or visible light. Accordingly, an existing exposure system having an exposing light source that emits ultraviolet rays or visible light can be used in order to expose the resist layer. Furthermore, since the resist material composed of the incomplete oxide of the transition metal has a small molecular size, the developed resist layer has a superior edge pattern, thus achieving a highly precise patterning.

According to the method for manufacturing an optical disc using the optical disc master described above, an optical disc having the recording capacity of 25 GB class can be produced with the existing exposure system.

The invention claimed is:

1. A method for manufacturing an optical disc master, comprising:

forming a resist layer including a resist material, said resist material comprising an incomplete oxide of a transition metal on a substrate, the oxygen content of the incomplete oxide being smaller than the oxygen content of the stoichiometric composition corresponding to a valence of the transition metal, which increases the absorption of ultraviolet rays and visible light rays, the resist material being an amorphous inorganic material containing an oxide;

selectively exposing the resist layer according to a recording signal pattern; and developing the resist layer to form a predetermined irregular pattern; the transition metal is at least one metal selected from the group consisting of Mo and W; and the resist layer is selectively exposed with ultraviolet rays or visible light.

2. The method for manufacturing an optical disc master according to claim 1, wherein the incomplete oxide of the transition metal further comprises an element other than transition metals.

3. The method for manufacturing an optical disc master according to claim 2, wherein the element other than transition metals is at least one element selected from the group consisting of Al, C, B, Si, and Ge.

4. The method for manufacturing an optical disc master according to claim 1, wherein the ultraviolet rays or the visible light has a wavelength of 150 nm to 410 nm.

5. The method for manufacturing an optical disc master according to claim 1, wherein the resist layer is formed on a substrate comprising at least one material selected from the group consisting of plastic, silicon, alumina-titanium carbide, and nickel.

6. The method for manufacturing an optical disc master according to claim 5, further comprising the step of: forming an interlayer having a thermal conductivity smaller than the thermal conductivity of the substrate, wherein, said forming of an interlayer occurs before forming the resist layer, and the interlayer is disposed between the substrate and the resist layer.

7. The method for manufacturing an optical disc master according to claim 6, wherein the interlayer comprises a thin film, said thin film comprising at least one material selected from the group consisting of amorphous silicon, silicon dioxide, silicon nitride, and alumina.

8. The method for manufacturing an optical disc master according to claim 1, wherein the resist layer is formed by sputtering or vapor deposition.

9. The method for manufacturing an optical disc master according to claim 1, wherein the incomplete oxide of the transition metal is $MoO_3$ and the oxidation state of the incomplete oxide of the transition metal is converted into a composition ratio of $Mo_{1-x}O_x$ and the value x is represented by $0<x<0.75$.

10. The method for manufacturing an optical disc master according to claim 1, wherein the incomplete oxide of the transition metal is $WO_3$ and the oxidation state of the incomplete oxide of the transition metal is converted into a composition ratio of $W_{1-x}O_x$ and the value x is represented by $0<x<0.75$.

11. A method for manufacturing an optical disc, comprising the steps of:

forming a resist layer comprised of a resist material including an incomplete oxide of a transition metal on a substrate, the oxygen content of the incomplete oxide being smaller than the oxygen content of the stoichiometric composition corresponding to a valence of the transition metal, which increases the absorption of ultraviolet rays and visible light rays, the resist material being an amorphous inorganic material containing an oxide;

selectively exposing the resist layer according to a recording signal pattern;

developing the resist layer to form a resist master comprising a predetermined irregular pattern; the transition metal is at least one metal selected from the group consisting of Mo and or W; and the resist layer is selectively exposed with ultraviolet rays or visible light;

using the resist master to form a molding stamper having the irregular pattern of the resist master; and contacting the molding stamper with a thermoplastic resin.

* * * * *